2,745,781
Patented May 15, 1956

United States Patent Office

2,745,781
PARASITICIDE COMPOSITION AND METHOD

Doane Stewart, Garden Grove, Calif., assignor to The Dow Chemical Company, Midland, Mich., a corporation of Delaware No Drawing. Application July 6, 1951,
Serial No. 235,560

6 Claims. (Cl. 167—31)

This invention relates to parasiticide compositions and is particularly directed to an improved composition comprising the ethanolamine salts of 2,4-dinitro-6-secondary-butyl-phenol as an active toxicant, and to a method for increasing the effectiveness and reducing the phytotoxic properties of compositions comprising such amine salt.

The ethanolamine salts of 2,4-dinitro-6-secondarybutyl-phenol have been widely employed as constituents of parasiticide compositions and particularly for the control of aphid and mite infestation. Peculiarly enough, the parent phenol and certain of its salts are sufficiently phytotoxic to vegetation and plant parts as to have been employed on a large scale in herbicidal compositions. Thus, it has not heretofore been considered practical to utilize the ethanolamine salts of 2,4-dinitro-6-secondarybutyl-phenol otherwise than in dormant application, in which type of application residual effectiveness is of great importance.

It is an object of the present invention to provide an improved composition comprising an ethanolamine salt of 2,4-dinitro-6-secondarybutyl-phenol as an active toxic ingredient. It is a further object to provide a such composition which will not be as phytotoxic as would normally be the case with a composition including a parasiticidal concentration of the ethanolamine salt. An additional object is to provide an aqueous spray mixture comprising an ethanolamine salt of 2,4-dinitro-6-secondarybutyl-phenol, which spray will have an extended residual toxicity against plant pests and be safened against injury of plants and plant parts. A still further object is to supply a method for safening or rendering less phytotoxic aqueous dispersions of the ethanolamine salts of 2,4-dinitro-6-secondarybutyl-phenol. Other objects will become evident from the following specification and claims.

It has now been discovered that compositions comprising ethanolamine salts of 2,4-dinitro-6-secondarybutyl-phenol are improved both as regards parasiticidal and phytotoxic properties by the addition thereto of methylcellulose. Thus, the incorporation of the methylcellulose into the aqueous solution of the amine salt appears materially to increase the effectiveness of the latter against mite organisms. Further, the period of residual activity of the modified composition is significantly extended over that of a simple aqueous solution of the amine salt. Also, the spray composition so obtained is significantly less injurious to plants and plant parts than a similar composition in which the methylcellulose is not employed.

The expression "ethanolamine," as herein employed, refers to monoethanolamine, diethanolamine, triethanolamine, and mixtures of any two or all of these amines. The salts of these amines with 2,4-dinitro-6-secondarybutyl-phenol are yellow crystalline solids readily soluble in water. They are readily prepared by reacting together the amine and phenol, and preferably in the presence of ethanol or water as a reaction solvent. In practice, the free amine salt is not ordinarily separated, but the aqueous reaction product employed as such in the formation of spray mixtures. Frequently, the ethanolamine of commerce, consisting of a mixture of mono, di and triethanolamines, is employed in the preparation of the aqueous salt product.

Methylcellulose is a water-soluble cellulose ether derived by reacting purified cotton or wood cellulose (in the form of alkali cellulose) with methyl chloride. The degree of methoxyl substitution is approximately two groups per anhydro-glucose residue in the cellulose chain. The methoxyl content of the product varies from 27.5 to 31 percent. Methylcellulose is frequently rated in terms of its aqueous solutions as being of low, medium and high viscosity types, of which 15, 400 and 4000 centipose materials, respectively, are representative. The product is characterized by being soluble in cold water and substantially insoluble in hot water.

In the present operation, the methylcellulose may be employed in any suitable form. Thus, concentrates may be prepared comprising the amine salt compound in intimate dispersion with methylcellulose in the form of a finely divided powder. In a further modification, the amine salt and methylcellulose may be compounded together in water to produce a liquid concentrate adapted to be diluted to produce the ultimate spray mixture. Alternatively, an existent dilute aqueous dispersion of an operative concentration of either the amine salt compound or the methylcellulose may be modified by the addition of the desired proportion of the ingredient not already present therein, e. g. a concentrated aqueous solution of methylcellulose may be added with stirring to an existent dilute aqueous solution of a parasiticide mixture comprising an ethanolamine salt of 2,4-dinitro-6-secondarybutyl-phenol as an active toxicant.

The proportions of materials vary considerably with the intended end use of the composition. Any suitable amount of methylcellulose may be employed, somewhat smaller proportions of the high viscosity type being operable than are required in the case of the low viscosity product. Thus, in a finished spray mixture, as little as 0.25 ounce of 4000 centipoise methylcellulose per 100 gallons or 1.0 ounce of 15 centipoise material per 100 gallons gives desirable results. However, in practice it is preferred to have present in the aqueous spray at least one ounce of methylcellulose per 100 gallons of ultimate mixture, and 4 or more ounces of 15 centipoise material and 2 or more ounces of 4000 centipoise methylcellulose may advantageously be employed.

It is to be understood that any suitable wetting and dispersing agent may be employed in either the concentrate or diluted spray, e. g. sodium lauryl sulfate, alkali metal salts of aromatic sulfonic acids, and esters of sulfated aliphatic derivatives. Similarly, other adjuvants such as mutual solvents, freezing point depressants, stabilizers and supplementary toxicants may be included in the described compositions.

The following examples illustrate the invention but are not to be construed as limiting:

Example 1

17.3 parts by weight of triethanolamine, 22.7 parts by weight of 2,4-dinitro-6-secondarybutyl-phenol and 20 parts by weight of water were mixed and thereafter diluted with an additional 40 parts by weight of water to obtain an aqueous solution of the triethanolamine salt of 2,4-dinitro-6-secondary-butyl-phenol. This composition was employed as a parasiticide concentrate for the preparation of various spray-mixtures.

1.5 ounces of 15 centipoise methylcellulose was dispersed in a small amount of cold water, and the resulting syrupy liquid poured with stirring into 50 gallons of water. To the resulting solution, there was then added one quart of the amine salt concentrate as prepared above to obtain a spray-mixture which was applied for the control of overwintering European red mite eggs on dormant cherry trees. A similar application was made of an unmodified dilution of one quart of the amine salt concentrate in 50 gallons of water. The following table sets forth the results observed upon examination of the foliage of the trees at seven and fifteen week intervals following application:

| Material | European Red Mites per 100 Leaves | |
|---|---|---|
|  | 7 weeks | 15 weeks |
| Unmodified spray | 300 | 1,000 |
| Spray containing methylcellulose | 100 | 300 |

Check trees were completely over-run with mites, counts often running to several hundred per leaf.

*Example 2*

A similar operation was carried out with the amine salt concentrate of the preceding example to determine the phytotoxicity of modified and unmodified aqueous spray mixtures against lemons.

Here, the unmodified spray composition containing 1 quart of concentrate per 100 gallons, caused definite injury to the fruit 36 days after application with large necrotic indentations burned in the fruit surfaces. Injury was particularly evident where the spray had collected and dried to leave a residue on the blossom end of the fruit.

The incorporation of 2 ounces of 15 centipoise methylcellulose per 100 gallons of spray eliminated injury to the lemon fruits. 36 days after treatment, the fruits subjected to treatment with the modified composition could not be differentiated in appearance from fruit sprayed only with water.

*Example 3*

23.4 parts by weight of 2,4-dinitro-6-secondarybutyl-phenol was added portionwise with stirring to a solution of 18.7 parts by weight of mixed mono-, di- and triethanolamines in 30 parts by weight of isopropanol. 27.9 parts of water was then added to this crude product to obtain an amine salt concentrate having a specific gravity of 1.040 at 20°/20° C. and a crystallization point beginning at about 1° F.

The foregoing concentrate was applied at ¼ to ½ pint per 100 gallons of aqueous spray as a post-harvest spray on apple and pear trees for the control of two spotted spider mite, European red mite and green apple aphis. An excellent control of parasites was obtained but the treatments caused the development of necrotic spots on the foliage.

In concurrent applications, 15 centipoise and 4000 centipoise methylcellulose modified sprays were applied. The proportion of methylcellulose employed was one ounce per 100 gallons of spray. The presence of the methylcellulose resulted in improved parasiticidal activity of the applied compositions and substantially eliminated leaf injury.

*Example 4*

61 pounds of isopropanol and 19 pounds of diethanolamine were mixed together and 41.5 pounds of 2,4-dinitro-6-secondarybutyl-phenol added portionwise thereto with stirring. 47 pounds of water was then stirred into the mixture to produce a spray concentrate having a specific gravity of 1.017 at 20°/20° C.

This concentrate is adapted to be employed at 0.25 to 1.0 pint per 100 gallons of water containing from 1.0 to 4.0 ounces of 400 centipoise methylcellulose for the control of various mite and aphid organisms without substantial injury to the foliage and fruit of citrus and deciduous trees.

I claim:

1. An aqueous spray composition having dispersed therein an ethanolamine salt of 2,4-dinitro-6-secondarybutyl-phenol and methylcellulose, the latter being in such proportion as to exert an energising action upon the amine salt compound as regards parasiticidal and residual activity.

2. An aqueous spray composition having dispersed therein an ethanolamine salt of 2,4-dinitro-6-secondarybutyl-phenol and methylcellulose, the latter being present in the proportion of at least one ounce per 100 gallons of spray composition.

3. An aqueous spray composition having dispersed therein the triethanolamine salt of 2,4-dinitro-6-secondarybutyl-phenol and at least one ounce of methylcellulose per 100 gallons of spray composition.

4. A composition in accordance with claim 1 in which the methylcellulose is of high viscosity type.

5. A composition in accordance with claim 1 in which the methylcellulose is of low viscosity type.

6. A method for increasing the parasiticidal effectiveness and reducing the normal phytotoxicity of aqueous solutions of the ethanolamine salts of 2,4-dinitro-6-secondarybutyl-phenol which includes the step of dispersing in such aqueous solutions methylcellulose in the amount of at least one ounce per 100 gallons of solution.

References Cited in the file of this patent

UNITED STATES PATENTS

| | | |
|---|---|---|
| 2,166,122 | Boyce | July 18, 1939 |
| 2,166,123 | Boyce | July 18, 1939 |
| 2,222,486 | Moore | Nov. 19, 1940 |
| 2,225,619 | Britton | Dec. 24, 1940 |
| 2,328,505 | Smith | Aug. 31, 1943 |
| 2,369,992 | Treacy | Feb. 20, 1945 |
| 2,392,859 | Meuli | Jan. 15, 1946 |
| 2,495,270 | Littler | Jan. 24, 1950 |
| 2,519,780 | Morrill | Aug. 22, 1950 |
| 2,528,544 | Pijoan | Nov. 7, 1950 |
| 2,547,261 | Geiger | Apr. 3, 1951 |
| 2,553,577 | Hale | May 22, 1951 |
| 2,579,430 | Hammer | Dec. 18, 1951 |

FOREIGN PATENTS

| | | |
|---|---|---|
| 597,483 | Great Britain | Jan. 27, 1948 |